United States Patent [19]

Singleton

[11] 4,192,770

[45] Mar. 11, 1980

[54] CRACKING CATALYST RESTORATION WITH BORON COMPOUNDS

[75] Inventor: David M. Singleton, Houston, Tex.

[73] Assignee: Shell Oil Company, Houston, Tex.

[21] Appl. No.: 909,234

[22] Filed: May 24, 1978

[51] Int. Cl.$^2$ .................... B01J 29/38; B01J 21/10; B01J 21/02; C10G 11/04
[52] U.S. Cl. .................... 252/414; 208/52 CT; 208/114; 208/120; 252/411 R; 252/412; 252/413; 252/416; 252/432
[58] Field of Search ............... 252/414, 413, 412, 411, 252/416, 432; 208/114, 120, 52 CT

[56] References Cited

U.S. PATENT DOCUMENTS

| | | | |
|---|---|---|---|
| 2,579,133 | 12/1951 | Warner et al. | 252/413 |
| 2,636,845 | 4/1953 | Richardson et al. | 208/114 |
| 4,049,573 | 9/1977 | Kaeding | 252/432 |

Primary Examiner—P. E. Konopka
Attorney, Agent, or Firm—Ronald R. Reper

[57] ABSTRACT

A process for restoring selectivity of cracking catalysts which are contaminated with metals during cracking operations which comprises contacting the catalyst with at least one boron compound for a time sufficient to restore selectivity of the catalyst.

8 Claims, 2 Drawing Figures

CRACKING CATALYST RESTORATION WITH BORON COMPOUNDS

BACKGROUND OF THE INVENTION

This invention relates to restoring selectivity of cracking catalysts which are contaminated with metals during catalytic cracking operations. The term selectivity herein refers to conversion of the feed to desired gasoline range hydrocarbons. Corollary to increased selectivity is decreased production of coke and hydrogen.

Conventionally catalytic cracking processes are used to crack heavy hydrocarbon feedstocks to produce gasoline and light distillate fractions and in which process there is no net consumption of hydrogen. Metals typically present in the feedstock, such as nickel, vanadium and iron tend to deposit on and contaminate the catalyst resulting in deterioration of its selectivity, which thereby results in decreased gasoline production. Further, the contaminant metals tend to increase undesirable coke production and to increase undesirable secondary cracking as manifested by an increase in hydrogen production.

The use of boron is known in the original preparation of catalysts suitably employed for cracking of heavy hydrocarbons; see e.g., U.K. Pat. No. 1,313,174 and Netherlands patent application No. 7614020. Additionally, boron is disclosed as a promoter for a variety of crystalline alumino-silicate catalysts in e.g., U.S. Pat. Nos. 3,293,192; 3,328,119; 3,346,512; 3,740,347; 3,758,538; 3,072,563; 3,803,026 and 4,029,716. However, no patents have been found disclosing the use of boron for restoring the selectivity of metals contaminated cracking catalyst.

SUMMARY OF THE INVENTION

This invention provides a process for restoring, at least partially, the selectivity of a cracking catalyst which is contaminated with metals such as nickel, vanadium and iron during cracking operations which process comprises contacting said catalyst during cracking with at least one boron compound for a time sufficient to restore the activity of said catalyst.

DESCRIPTION OF PREFERRED EMBODIMENTS

Figure 1:
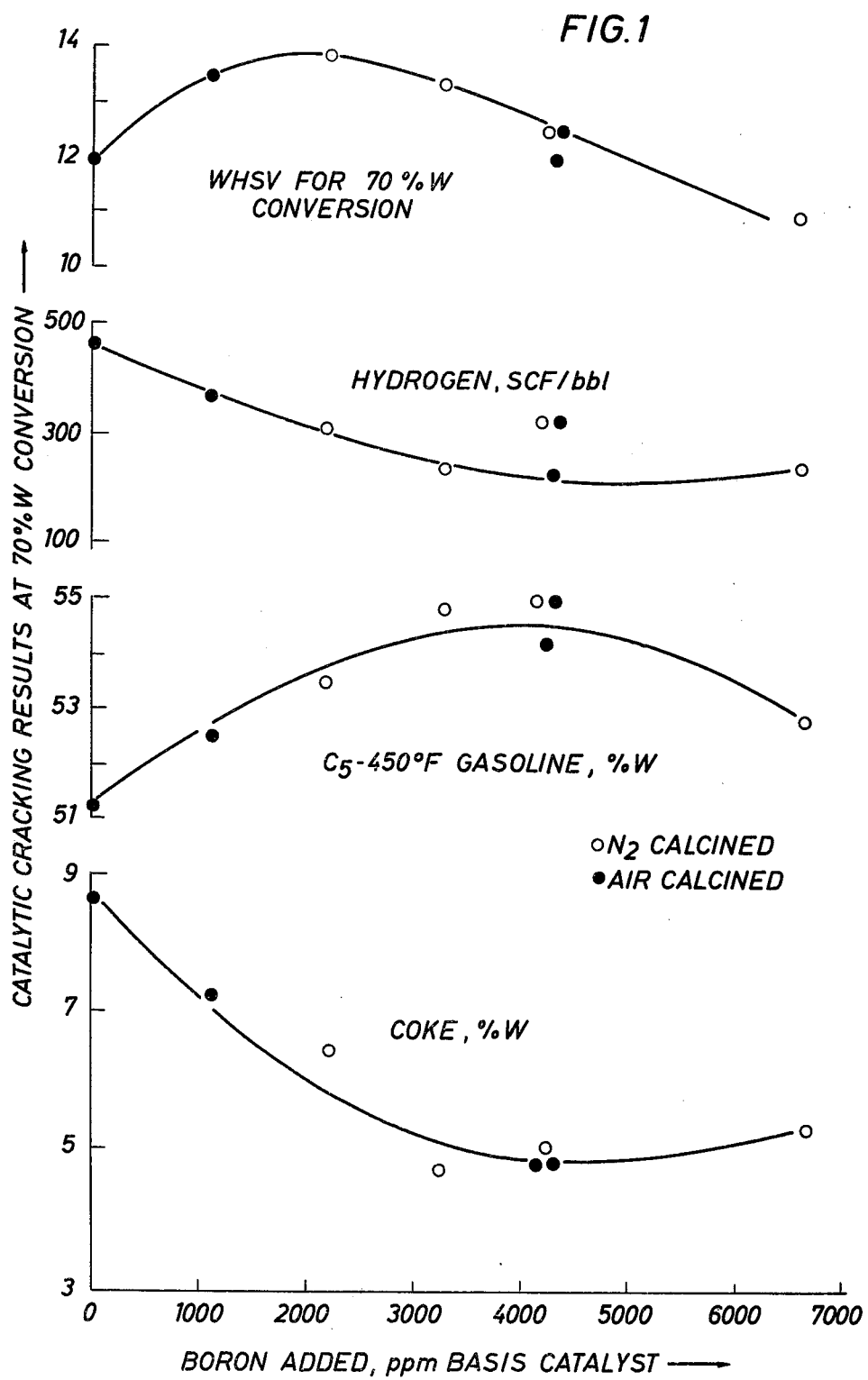
FIG. 1 graphically compares product yields at a given conversion over as metals containing equilibrium catalyst treated with increasing concentrations of boron according to the invention.

The cracking catalysts to which the process of this invention may be applied are those conventionally employed in the petroleum industry for the production of motor fuel range hydrocarbons from heavier hydrocarbon oils, mostly in the gas oil or higher boiling ranges.

Such conventional cracking operations generally are conducted at temperatures in the range from about 400° C. (752° F.) to about 650° C. (1202° F.) at pressures ranging from subatmospheric pressure to several hundred atmospheres, with widely varying feed rates and fixed bed, moving bed, fluid catalyst, suspensoid or riser type operation and in the absence of added hydrogen, specific conditions depending upon the character of the feed and the products desired. The feedstocks to the cracking operations generally are hydrocarbons derived from petroleum, shale oils and/or tar sands and have an initial boiling point substantially above the gasoline boiling range. Exemplary feedstocks include gas oils, fuel oils, deasphalted oils, waxes, residual oils and the like.

These processes normally employ such catalysts as various natural and treated clays, various composites of silica gel with alumina, magnesia and/or boria, activated alumina and such materials composited with naturally occurring or synthetic crystalline alumino silicates or, as they are sometimes referred to, zeolites. The zeolite component of such catalysts can have been ion exchanged to provide metallic ions, such as for example rare earth metal ions, which affect the activity of the catalysts. This invention is particularly applicable to zeolite-containing cracking catalysts.

The cracking catalysts employed in the process of this invention will be at least partly deactivated by contamination thereon of metals such as nickel, vanadium and iron and will deteriorate to such extent that optimum product yields are no longer obtained. The process of this invention is generally applicable to cracking catalysts containing up to about 20,000 ppm or more of metals.

The level of boron on the cracking catalyst is maintained by the addition of a boron-containing treating agent either to the fresh make-up catalyst or to the catalyst during operations.

The treating agents employed in the process of this invention are compounds of boron and may be organic or inorganic. Suitably the treating agent compounds are either oxides or are convertible to oxides upon calcination of the catalyst containing the treating agent. Exemplary treating agents are boric acid, boric oxide, boron pentasulfide, boron trichloride, ammonium biborate, calcium borate, diborane, magnesium borate, methyl borate, butyl borate, tricyclohexyl borate, 2,6-ditert-butylphenyl dibutyl borate, cyclohexyl boronic acid, monoethyl dodecyl acid boronate and mixtures of these. Treating compounds such as sodium tetraborate containing significant proportions of sodium or other known cracking catalyst poisons are less desirable as the effects of such poisons tend to obscure the beneficial effect of the boron.

The treating agents can be employed in any method which causes the treating agent to contact with and deposit on the catalyst. Exemplary methods include e.g., deposition from suitable carrying agents, impregnation and dry mixing. The treating agent may be applied to the catalyst before or after contamination with metals from the feed. Deposition is the preferred method. A suitable organic boron compound such as an alcohol ester, e.g., tri-n-pentylborate, is dissolved or dispersed in a suitable carrier, e.g., xylene, added to the hydrocarbon charge stock to the cracking process and is contacted with the catalyst under cracking conditions. Suitably, amounts of the boron compound in the hydrocarbon feed may range from about 0.01 to about 10,000 ppm and preferably from about 0.1 to about 5000 ppm of said hydrocarbon. Alternately the boron treating compound, such as boric acid in aqueous solution, may be introduced into the regeneration zone along with the conventionally applied stripping steam. If the impregnation method is used, the boron-containing treating agent can be dissolved in either aqueous or non-aqueous solution. For example, an aqueous solution of ammonium biborate may be used or if a non-aqueous solvent is desired a xylene solution of an aryl borate compound such as 2,6-ditert-butylphenyl borate may be used. Typically the treating agent is applied to the catalyst in amounts of less than about 1%w of boron (calculated as metal) basis the cracking catalyst. It is generally preferred to supply an amount of boron in the range from about 0.05 to about 5 moles and particularly from about 0.1 to about 2 moles of boron per mole of contaminating metals.

The amount of metals on the catalyst may be determined in any conventional manner, e.g., wet analysis, plasma emission spectroscopy and the like. This amount of added boron may be determined by any acceptable analytical procedure. The plasma emission procedure has been found particularly suitable.

After deposition of the treating agent on the catalyst, the catalyst can be further treated according to conventional procedures. These procedures involve calcination of the catalyst at elevated temperatures, suitably in the range from about 425° C. (797° F.) to about 870° C. (1598° F.) for a period of time ranging from about 0.05 to 30 hours or more in an inert gas or preferably in the presence of a free oxygen-containing gas to convert any boron agent not already in the form of oxide, to the oxide. This further treatment can be effected in a conventional catalyst regeneration step.

The feedstocks concerned herewith are those which are conventionally employed in catalytic cracking processes for the production of gasoline from heavier hydrocarbon stocks and include such materials as gas oils, cycle oils, residuums and the like. For catalytic cracking operations with feeds containing high levels of contaminating nickel and vanadium a preferred mode of operation would be to add fresh makeup catalyst which has been treated to contain a level of boron below that desired in the equilibrium catalyst, and to add additional quantities of boron compound during the cracking operation to facilitate more even distribution of boron within the catalyst and to maintain desired control of treating levels, whereby the deleterious effects may be avoided for levels of boron greatly in excess of the contaminant metal concentration on the catalyst.

The following examples are given for the purpose of further illustrating the practice of the method of the present invention. However, it is to be understood that these examples are given by way of exemplification only, and are not intended in any way to limit the scope of the present invention.

EXAMPLES

The catalysts for Examples 1 and 2 were equilibrium catalysts obtained from commercial operations cracking feed derived from mid-continent crude. Each of the catalysts was treated with a boron treating agent and are shown as catalysts 1A and 2A, respectively. For the examples the concentration of the metals on the catalysts at the beginning of each run were as follows:

| Example | 1 | 1A | 2 | 2A |
|---|---|---|---|---|
| Metal content, ppm | | | | |
| Nickel | 2700 | 2700 | 1300 | 1300 |
| Vanadium | 6300 | 6300 | 1100 | 1100 |
| Iron | 5900 | 5900 | 6600 | 6600 |

-continued

| Example | 1 | 1A | 2 | 2A |
|---|---|---|---|---|
| B | 0 | 4300 | 0 | 520 |

Boron was added to the catalyst for Example 1A by dry impregnation with a solution of 5.44 grams of tripentylborate in 15 ml toluene applied to 50 grams of catalyst. The tripentylborate is oil soluble and thus could be added with the feed during cracking operations. Following the boron impregnation, the catalyst was dried to a temperature of 482° C. (900° F.) under nitrogen (to avoid hazardous oxidation of the toluene) and then was calcined in air at about 482° C. (900° F.). For the catalyst of Example 2A the boron was added by dry impregnation with an aqueous solution of 0.74 grams of boric acid in 7.5 ml of water to 25 grams of catalyst, followed by drying in $N_2$ for 1 hour at 482° C. (900° F.) followed by calcination in air for one hour at temperatures of about 482° C. (900° F.).

Catalyst samples from the preceding and following examples were tested in a fixed bed micro-activity test catalytic cracking unit under standard conditions as shown in the following table:

| Examples | |
|---|---|
| Feed Preheat Temp., °F. | 900 |
| Catalyst Temp., °F. | 900 |
| Catalyst/oil ratio | 2.5/1–7/1 |
| Catalyst Holding Time, sec. | 56 |

The gas oil feed for the examples had the following properties:

| | |
|---|---|
| Gravity, °API | 26.1 |
| Sulfur, wt. % | 0.8 |
| Saturates, wt. % | 56.88 |
| Monoaromatics, wt. % | 18.94 |
| Diaromatics, wt. % | 17.04 |
| Triaromatics, wt. % | 6.04 |
| Tetraaromatics, wt. % | 0.10 |
| Basic Nitrogen Nuclei, wt. % | 0.20 |

Feed rate was varied to give at least three conversion levels to permit interpolation of the catalyst performance data to 70 or 75% by weight conversion as follows:

| Example | 1 | 1A | 2 | 3A |
|---|---|---|---|---|
| | 70% Conv. | | 75% Conv. | |
| WHSV for noted Conv. | 12 | 12 | 13.2 | 15 |
| Yields @ | 70% Conv. | | 75% Conv. | |
| $H_2$, SFC/bbl | 460 | 270 | 190 | 130 |
| $C_5$-450° F. Gasoline, % w | 51.2 | 55 | 57 | 59 |
| Coke, % w | 8.6 | 5 | 6.2 | 4.6 |

From the above it is apparent in both examples that gasoline yield has been increased and coke and hydrogen yields have been significantly reduced according to the invention through the addition of an organoboron compound in Example 1A or boric acid in Example 2A to the metal contaminated catalysts, as compared to the untreated catalysts of Examples 1 and 2, respectively.

For examples 3 and 4 a sample of the contaminated catalyst of example 1 was dry impregnated with an aqueous solution of boric acid so as to give the same level of added boron (4300 ppm) as example 1A. The boron containing catalyst was dried to a temperature of about 482° C. (900° F.) under nitrogen. One-half of the dried catalyst was tested to determine its cracking performance and the results are shown as example 3. The other half of the dried catalyst was calcined in air at about 482° C. (900° F.) for one hour to fix the boron on the catalyst. Results of the testing of the air calcined catalyst of Example 4 are summarized below:

| Example | 1 | 3 | 4 |
|---|---|---|---|
| WHSV for 70% Conversion | 12 | 12.5 | 12.5 |
| Yields at 70% Conversion | | | |
| $H_2$, SCF/bbl | 460 | 320 | 320 |
| $C_5$-450° F. Gasoline, %w | 51.2 | 55 | 55 |
| Coke, %w | 8.6 | 5.0 | 4.8 |

From the results it appears that calcination environment has no significant affect on the performance of contaminated catalysts impregnated with boric acid. Similar studies with an organo-boron (tripentylborate) impregnated catalyst showed slightly higher activity for the air calcined catalyst. It is worthy of note that, within the experimental uncertainty of the tests, the catalysts of Examples 3 and 4 showed the same catalytic performance as that of Example 1A indicating that this organoboron compound and boric acid are essentially equivalent in their efficacy for passivation of metal contaminants.

Figure 2:
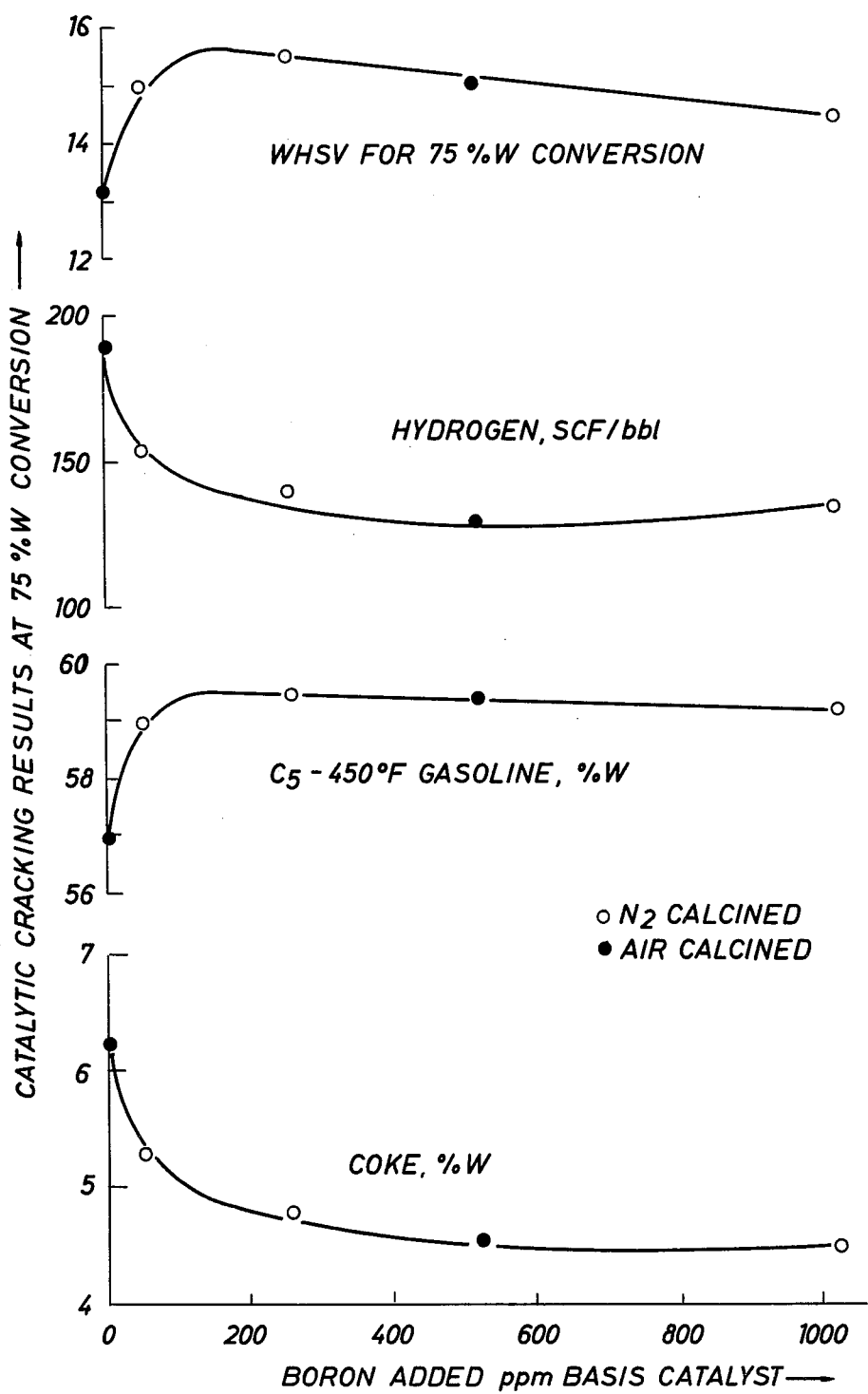
FIG. 2 illustrates the same relationship for a different catalyst containing lower level of metal contaminants and at a higher conversion.

From the data illustrated in FIGS. 1 and 2 it can be seen that there is a preferred level of boron to be added to a given contaminated catalyst. In the drawing FIG. 1 clearly shows an optimum level of boric acid to be added to the catalyst of Example 1. In FIG. 2 the catalyst of Example 2 shows a lower optimum level of boric acid to be added in agreement with its lower contaminants level.

To further delineate the role of boron as a metals control agent, known amounts of each of nickel, vanadium and iron, were added to a base catalyst. The base cracking catalyst employed in the following Examples 5-14 was a crystalline alumino silicate dispersed in a refractory oxide matrix and was an equilibrium catalyst obtained from a commercial fluid catalytic cracking unit cracking feed derived from Gulf Coast Crude. Performance testing of the base catalyst established that the low level of metal contaminants present in this equilibrium catalyst appeared to have essentially no effect on the catalytic cracking yields. Accordingly, any changes in catalyst performance are attributed to the added contaminant metal, and the boron restoration agent. In the following examples the catalyst prepared as indicated in each example was tested for cracking performance as previously described and the results are summarized in Table 1.

EXAMPLE 5

The base catalyst was calcined in air at about 538° C. for a period of 2 hours and was tested as described above.

EXAMPLE 6

To a first portion of the base catalyst nickel was added by impregnation with solution of nickel naphthenate in toluene. The impregnated catalyst was dried to a temperature of about 538° C. under nitrogen (to avoid hazardous oxidation of the toluene) and then was calcined in air at about 538° C. for 2 hours to fix the added nickel on the catalyst, after which the catalyst was tested as described above.

EXAMPLE 7

To a portion of the base catalyst boron was added by impregnation with an aqueous solution of boric acid. The catalyst was dried and calcined in $N_2$ at 482° C. (900° F.) for one hour and was tested as described above.

EXAMPLE 8

The procedure of Example 7 was repeated except that a larger amount of boron (shown in the Table) was impregnated into the catalyst.

EXAMPLE 9

The procedure of Example 6 was repeated except that the nickel naphthenate was replaced with vanadium naphthenate and a larger amount of vanadium was impregnated into the catalyst (since vanadium is less deleterious than nickel).

EXAMPLE 10

The procedure of Example 7 was repeated except that the starting catalyst was the product of Example 9 and that a higher amount of boron (shown in the table) was added to the catalyst.

EXAMPLE 11

The procedure of Example 10 was repeated except that a still greater amount of boron was added to the catalyst (see table).

EXAMPLE 12

The procedure of Example 6 was repeated except that the nickel naphthenate was replaced with a still larger amount of iron oxalate since iron is least deleterious to cracking activity of the three tested metal contaminants.

EXAMPLE 13

The procedure of Example 7 was repeated except that the starting catalyst was the product of Example 12 and that a larger amount of boron was added (see table).

EXAMPLE 14

The procedure of Example 13 was repeated except that the still greater amount of boron was added, as shown in the table.

TABLE 1

EFFECTIVENESS OF BORON CONTROL AGENT WITH ARTIFICIALLY CONTAMINATED CATALYST

Equilibrium zeolitic catalyst Plus Contaminants

| | Base | Base + 495 ppm N. (0.84 mg At./100g Cat.) | | |
|---|---|---|---|---|
| Example | 5 | 6 | 7 | 8 |
| Boron, mg At./100g Cat. | 0 | 0 | 1.06 | 3.2 |
| Microactivity Results | | | | |
| WHSV at 70% Conv. | 23 | 18 | 16.5 | 20.0 |
| Yields at 70% Conv. | | | | |
| $H_2$, SFC/B | 25 | 270 | 170 | 190 |
| Gasoline, %w | 58.0 | 54 | 54.5 | 54.5 |
| Coke, %w | 2.8 | 5.4 | 5.0 | 5.2 |

| | Base | Base + 1225 ppm V (2.4 mg At./100g Cat.) | | |
|---|---|---|---|---|
| Example | 5 | 9 | 10 | 11 |

TABLE 1-continued
EFFECTIVENESS OF BORON CONTROL AGENT WITH ARTIFICIALLY CONTAMINATED CATALYST Equilibrium zeolitic catalyst Plus Contaminants

| | | | | |
|---|---|---|---|---|
| Boron, mg At./100g Cat. | 0 | 0 | 2.2 | 8.8 |
| Microactivity Results | | | | |
| WHSV at 70% Conv. | 23 | 20 | 20 | 20 |
| Yields at 70% Conv. | | | | |
| $H_2$, SCF/B | 25 | 145 | 90 | 60 |
| Gasoline, %w | 58.0 | 56.0 | 56.0 | 56.5 |
| Coke, %w | 2.8 | 4.0 | 4.0 | 3.9 |

| | Base | Base + 6550 ppm Fe (11.7 mg At./100g Cat.) | | |
|---|---|---|---|---|
| Example | 5 | 12 | 13 | 14 |
| Boron, mg At./100g Cat. | 0 | 0 | 10.9 | 43.0 |
| Microactivity Results | | | | |
| WHSV at 70% Conv. | 23 | 15.5 | 16 | 19 |
| Yields at 70% Conv. | | | | |
| $H_2$, SCF/B | 25 | 400 | 310 | 230 |
| Gasoline, w% | 58.0 | 52.0 | 53.0 | 54.8 |
| Coke, %w | 2.8 | 7.8 | 6.9 | 5.3 |

Comparison of the results summarized in the table (Examples 7 and 8 vs. Example 6; Examples 10 & 11 vs. Example 9; and Examples 13 & 14 vs. Example 12) show that boron is an effective control agent against each of the contaminant metals, since hydrogen yields have been significantly reduced together with an increase in gasoline yield and generally lower coke production.

What is claimed is:

1. A process for restoring the selectivity of a zeolite-containing cracking catalyst which has become contaminated with at least one metal from the group consisting of nickel, vanadium and iron which comprises contacting said catalyst with a sole treating agent consisting essentially of at least one boron compound for a time sufficient to apply less than 1%w of boron to the cracking catalyst and to restore the selectivity of said catalyst.

2. A process as in claim 1 wherein said catalyst is contacted with said boron compound to deposit on said catalyst an amount of boron in the range from about 0.05 to about 2 moles per mole of contaminating metal present on said catalyst.

3. A process as in claim 1 wherein said boron compound is mixed with a hydrocarbon oil feed and then charged to a catalytic cracking zone along with said cracking catalyst.

4. A process as in claim 1 wherein said boron compound is contacted with said catalyst by impregnating said catalyst with a solution of said boron compound.

5. A process as in claim 1 wherein said boron compound is an inorganic compound.

6. A process as in claim 1 wherein said boron compound is an organic boron compound.

7. A process as in claim 1 wherein said cracking catalyst is first contacted with said boron compound and then is heated in the presence of free oxygen to regenerate said catalyst.

8. A process as in claim 7 wherein said catalyst is heated to a temperature in the range from about 800° to about 1600° F. for a period of time from about 0.05 to about 30 hours.

* * * * *